United States Patent [19]

Staar

[11] 3,862,729

[45] Jan. 28, 1975

[54] TAPE TRANSPORT WITH TWO FAST FORWARD SPEEDS

[75] Inventor: Theophiel Clement Jozef Lodewijk Staar, Kraainem, Belgium

[73] Assignee: Staar, S.A., Brussels, Belgium

[22] Filed: Oct. 10, 1973

[21] Appl. No.: 405,122

[52] U.S. Cl. .................................. 242/206, 360/73

[51] Int. Cl. ........................ B11b 15/32, G03b 1/04

[58] Field of Search ........................... 242/201–209; 360/73; 318/7, 12

[56] References Cited

UNITED STATES PATENTS

| | | | |
|---|---|---|---|
| 3,028,111 | 4/1962 | Geloso et al. | 242/202 |
| 3,254,287 | 5/1966 | Wolfner | 318/212 |
| 3,719,364 | 3/1973 | Hessland et al. | 242/206 X |

*Primary Examiner*—Leonard D. Christian
*Attorney, Agent, or Firm*—Wolfe, Hubbard, Leydig, Voit & Osann, Ltd.

[57] ABSTRACT

A tape transport mechanism for driving a tape from reel to reel is disclosed with a capstan drive for the tape providing constant playback or recording speeds, and two fast forward speeds, an intermediate speed and a higher speed. The high speed fast forward is provided by actuating a switching device to connect the drive motor for the mechanism to a source of power which operates the motor at a higher speed while coincidentally releasing the tape from the capstan drive. The intermediate speed is provided by releasing the tape from the capstan drive without actuating the switching device, so that the motor is connected to a power source which drives it at a speed normally producing the constant playback or recording speed. Manually actuated pushbutton controls are connected to the switching device and the components of the capstan drive to allow selection of constant playback-recording speed, intermediate speed, or high speed fast forward.

5 Claims, 6 Drawing Figures

TAPE TRANSPORT WITH TWO FAST FORWARD SPEEDS

The present invention relates to recording and/or playback mechanisms for magnetic tapes and particularly to those of the type wherein the tape is contained in a cartridge or cassette having two reels and the tape is movable from reel to reel past a magnetic head against which it is pressed by spring means and, generally, also between a pressure roller and a capstan which drives the tape at a constant speed.

In mechanisms of this kind, the tape-up reel is rotated either directly or through a friction slipping device. The latter device is necessary because as the tape is normally driven at a constant linear speed by the capstan, the tape-up reel rotational speed has to decrease gradually as the tape is accumulating thereon and, consequently, as the external diameter of the tape spool increases.

Such friction slipping devices are generally driven at a nominal speed slightly higher than the maximum speed at which the take-up reel must rotate, i.e., when the tape starts to be wound up on same. Usually, the capstan and the tape-up reel are driven by the same motor.

Most of the mechanisms of the kind described hereinabove are, moreover, equipped with a fast forward drive system for the tape which, after having released the tape from the pressure of the magnetic head and of the pressure roller, drives the take-up reel at a speed higher than the one corresponding to recording or playback.

Such a system involves generally several pulleys, belts, etc., which increase the cost of the mechanisms.

To overcome this drawback, mechanisms have been used which are equipped with a friction slipping device driven at a nominal speed much higher than the one at which the take-up reel must rotate when the tape starts to be wound on the spool. In this case, the fast drive of the tape occurs simply by temporarily releasing the tape from the head and capstan drive elements against which it is pressed in operative position.

This latter system is, of course, less costly to manufacture but shows nevertheless the following major drawback: since the friction slipping drive devices are not totally effective in absorbing the large difference between the nominal rotational speed at which they are driven and the actual rotational speed of the take-up reel which is determined by the driving speed of the tape, the result is uneven tape speeds during recording or playback which affects the quality of sound reproduction.

The compromise solution of reducing the nominal driving speed of the friction slipping devices is not satisfactory because this decreases proportionally the fast drive speed of the tape; thus, this compromise results in a mechanism which is satisfactory for neither of both functions.

The present invention has for its main object to obtain an effective fast forward drive device for the tape which does not affect the constant speed movement of the tape and which is as simple and as low cost as possible.

Another object is to provide a mechanism capable of constant speed tape drive at recording and playback speeds, and providing a high fast forward drive and, in addition, an intermediate fast forward drive which allows the user to monitor the recording on the tape better than at the higher speed.

A further object is to provide a push button control for a tape drive mechanism which allows the user to select fast forward or intermediate fast forward readily and conveniently.

In order to provide a full understanding of the invention, three embodiments thereof will be described hereinafter with reference to the enclosed drawings wherein.

Figure 1:
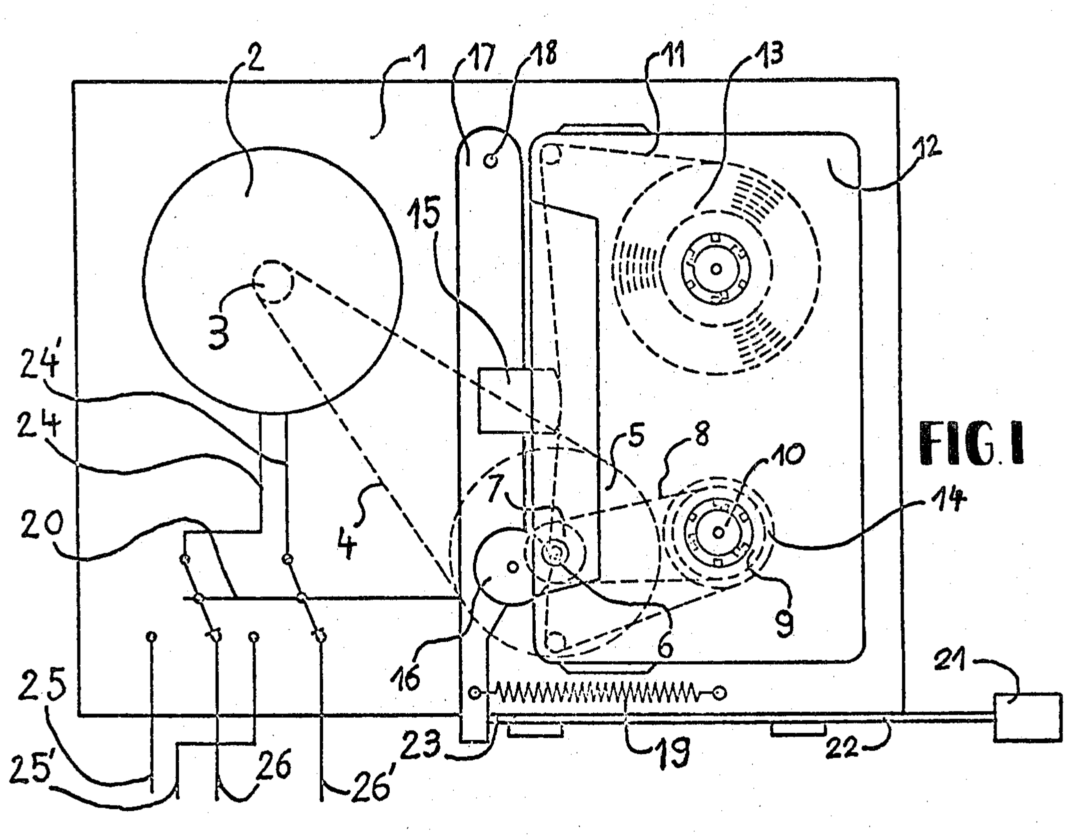
FIG. 1 is a view which shows a mechanism according to a first embodiment of the invention in the position in which the tape is driven at the recording or playback speed.
Figure 2:
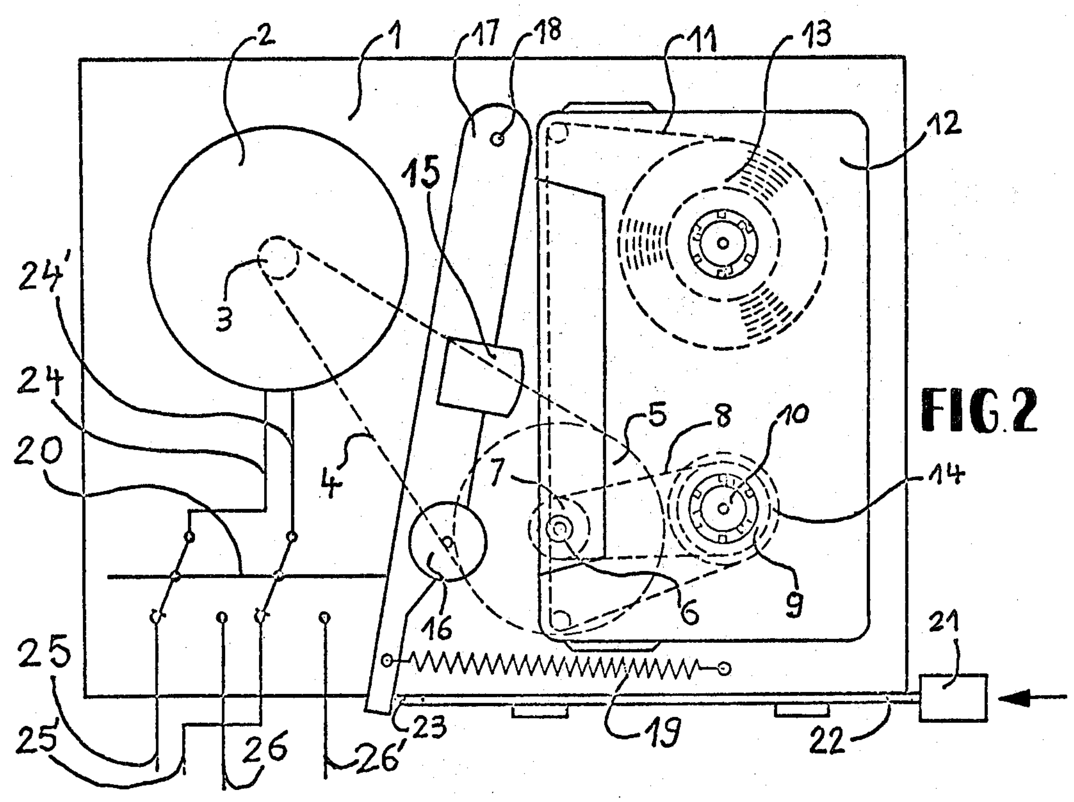
FIG. 2 is a view which shows the same mechanism driving the tape at fast forward speed.
Figure 3:
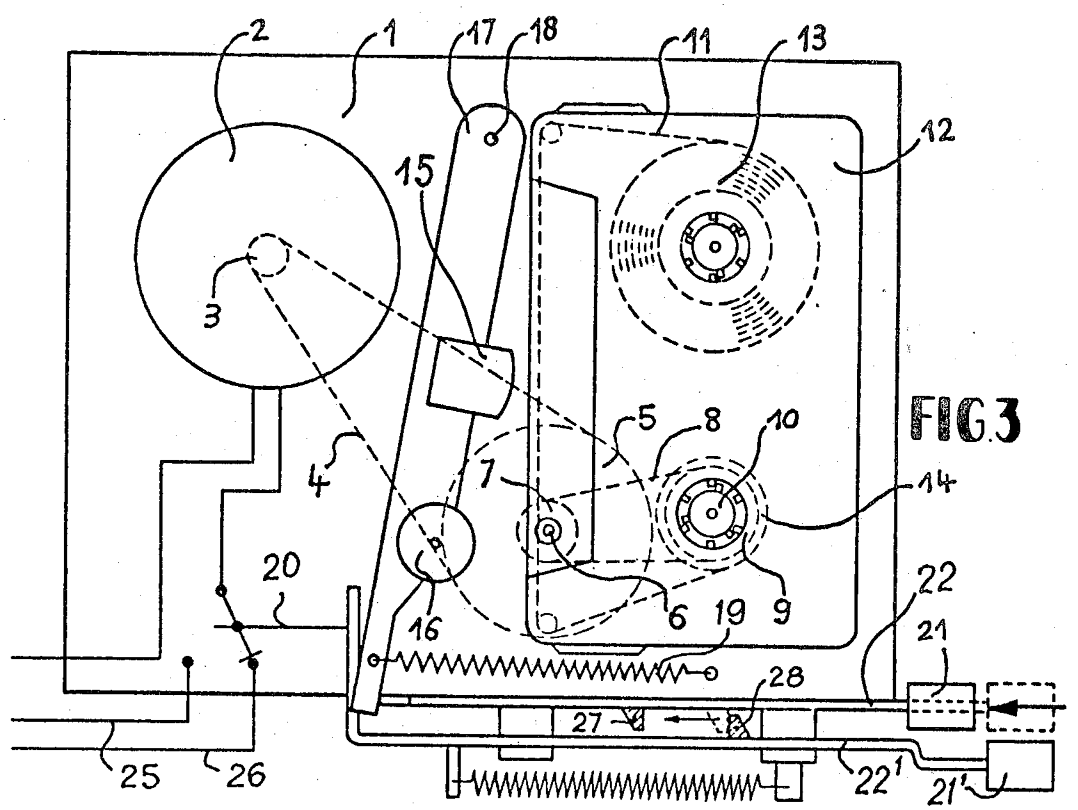
Figure 4:
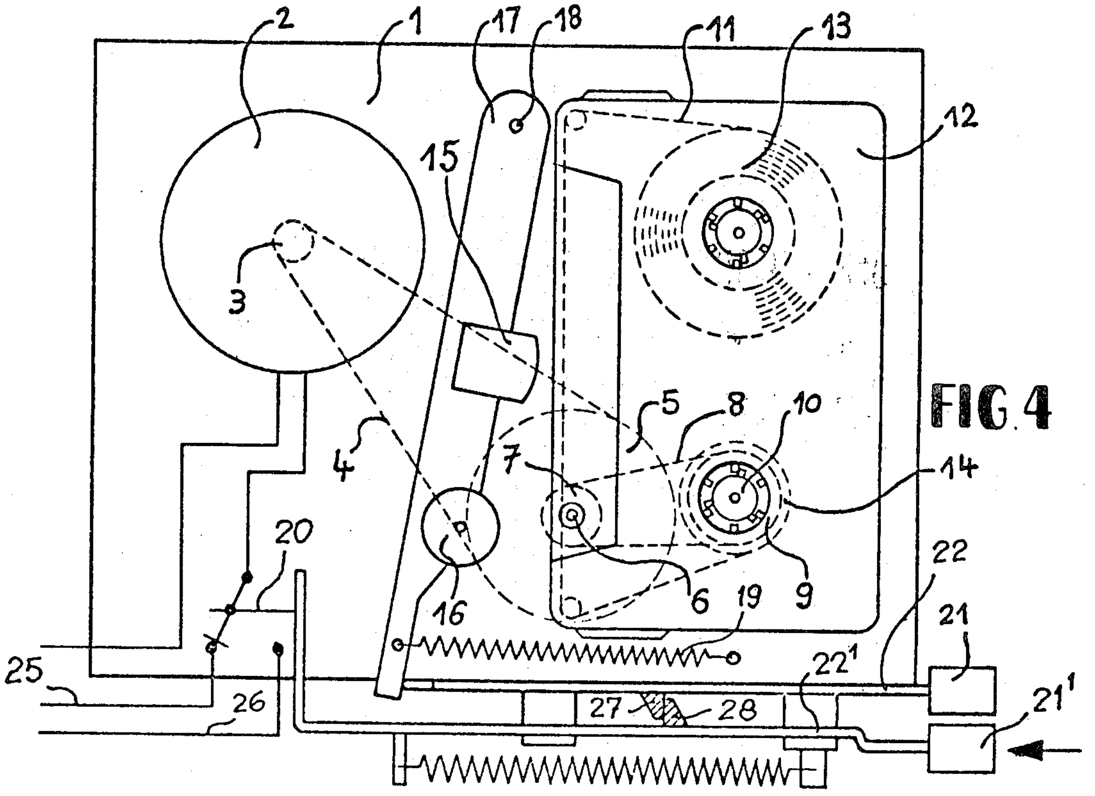
Figure 5:
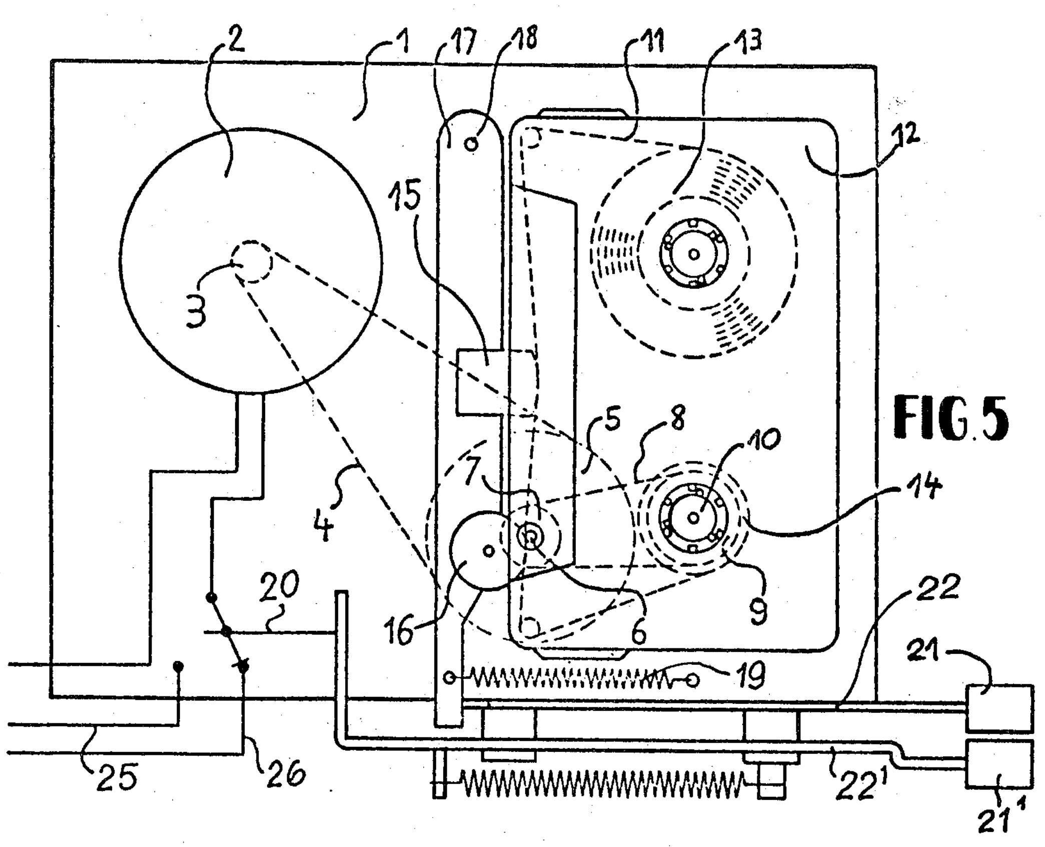
Figure 6:
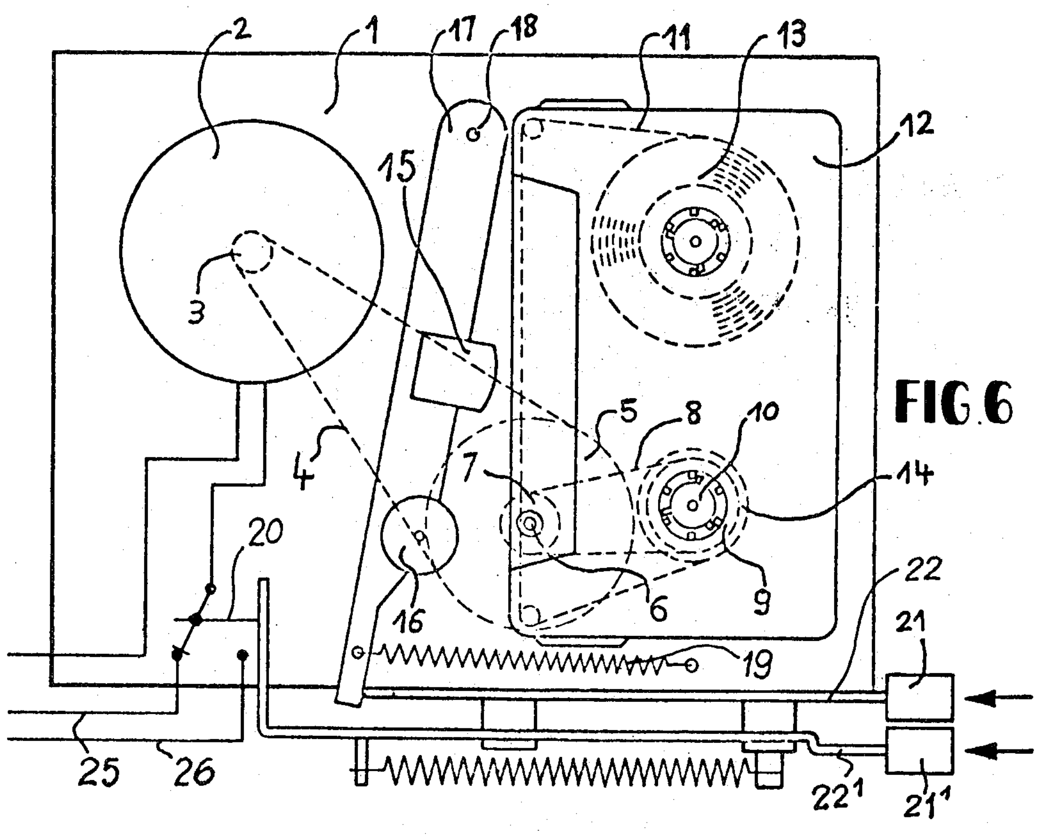

FIGS. 3 and 4 are views which relate to a second embodiment of the invention with positions corresponding respectively to an intermediate speed drive and a higher fast forward drive; and FIGS. 5 and 6 are views which relate to a third embodiment of the invention with the mechanism in positions corresponding respectively to FIGS. 1 and 2.

Referring to FIGS. 1 and 2, the invention is shown embodied in a mechanism consisting of a main frame 1 supporting a motor 2 (FIGS. 1 and 2) on which is mounted a pulley 3 which, through a belt 4, drives a flywheel 5 fixed on the capstan 6.

On the flywheel 5 is fixed a pulley 7 which, through a belt 8, drives a friction slipping device 9 connected to and driving a reel spindle 10.

In the illustrated embodiment, the tape 11 is stored in a cartridge 12 and is unwound from a take-off reel 13 to be wound on a take-up reel 14, after having passed before the magnetic head 15.

FIG. 1 shows the mechanism in a position in which it drives the tape 11 at normal recording or playback speed.

The tape 11 is moved at constant playback or recording speeds via a capstan drive including the capstan 6 and the pressure roller 16, which pinches the tape against the capstan 6 and which, driven by the motor 2, runs at a constant speed. The tape 11 is wound from the take-off reel 13 and is wound on the take-up reel 14, which, driven through the friction slipping device 9, causes a continuous pull on the tape.

The magnetic playback or recording head 15 and the pressure roller 16 are mounted on a supporting lever 17, pivotably mounted on a spindle 18 fixed to the frame 1 of the mechanism.

The supporting lever 17 tends to be maintained in its operative position as shown in FIG. 1, by a spring 19 fixed to the supporting lever 17 and to the frame 1.

As seen on FIG. 2, when pressure is exerted on the fast forward drive control push button 21, the slide 22 on which the pushbutton 21 is fixed moves along the main frame 1 and, through its end 23, shifts the supporting lever 17 out of its operative position, against the action of the spring 19.

In keeping with the invention, an inverter switch 20 operated by the movement of the supporting lever 17 is adapted to connect the wires 24 and 24' of the motor 2 either to a source of power 26 and 26' which causes the motor to rotate the capstan 6 to provide a constant recording-playback tape speed (FIG. 1), or to a power source 25 and 25' which causes a faster speed of the motor 2 when the pushbutton control 21 is actuated as illustrated in FIG. 2.

In this latter case, the capstan drive has been disconnected, since the pressure roller 16 has been shifted from operative position against the tape, and the playback-recording head 15 has also been released from the tape 11, thus enabling the friction slipping device 9 which is driven at higher speed by the motor 2 to move the tape from the take-off reel 13 to the take-up reel at fast forward speed.

In the embodiment of the invention illustrated in FIGS. 1 and 2, the tape is moved either at constant playback-recording speed by the capstan drive or at fast forward speed by direct drive to the take-up reel through the friction device 9.

It has been found desirable to also provide an intermediate tape speed to allow the user to monitor the tape as, for example, to have a more accurately controlled approach to a selected recording. Such a provision is included in the further forms of the invention illustrated in FIGS. 3–4 and 5–6. In those forms of the invention, it is the further object to furnish simple, effective and low cost means which make it possible, when desired, to produce a moderate or intermediate speed of the tape as well as high speed without losing the advantages of the invention as illustrated in FIGS. 1 and 2.

Such a moderate or intermediate tape speed is obtained, in keeping with the invention, by displacing from the tape the magnetic head and the pressure roller elements while the inverter is maintained in its position to cause the motor 2 to rotate at low speed corresponding to recording-playback speed of the tape. This results in the take-up reel being driven by the friction device 9 without slippage and thus the tape will be moved from reel to reel at faster than normal recording-playback speed.

Turning now to FIGS. 3 and 4, the mechanism comprises the same elements as those of FIGS. 1 and 2 having the references 1 to 26.

As in the form of the invention shown in FIGS. 1 and 2, there is an inverter switch 20 which is adapted to connect the wires of the motor 2 either to a power source 26 which causes the motor to drive the tape 11 by the capstan 6 at constant recording-playback speed, or to a power source 25 causing the motor 2 to rotate at a higher speed.

According to this embodiment there is provided a pushbutton control 21, as in FIGS. 1 and 2, which displaces the capstan drive and magnetic head elements from their operative position and coincidentally actuates the inverter, and in addition, there is provided a second control which is selectively operable to displace the said elements from their operative position without actuating the inverter switch.

As shown in FIGS. 3 and 4, the supporting lever 17 which tends to be maintained in the operative position shown in FIG. 1 by the spring 19 is actuated by the slide 22 via its pushbutton 21 while the inverter switch 20 is actuated by a slide $22^1$ when moved by its pushbutton $21^1$.

The slide 22 carries a projection 27 while the slide $22^1$ carries a projection 28 and those projections 27-28 are shaped and arranged such that the slide 22 may be moved alone under the pushing action of the button 21 so as to shift the lever 17 and displace only the elements 15 and 16, without actuating the inverter. However when the slide 22 is moved by the button $21^1$, the projection 28 engages the projection 27 on the slide 22 and moves the slide to shift the lever 17 coincidentally with actuation of the inverter switch.

The mechamisn as shown in FIGS. 3 and 4 operates as follows:

1. When the button 21 is pushed from the position of rest shown in dotted lines in FIG. 3 to the position shown in full lines on the same figure, the slide 22 is moved so as to produce only the displacement of the supporting lever 17 such that the elements 15-16 are moved away from the tape 11 and the projection 27 is displaced from the position indicated in dotted lines to the position indicated in full lines. Since the inverter switch 20 is not actuated, the tape will be driven at an intermediate speed via the friction device 9 driving the spindle 10 and take-up reel.

2. When the button $21^1$ is pushed (FIG. 4) the slide $22^1$ is displaced and the projection 28 acts on the projection 27 so as to carry away the latter and also the slide 22 and the button 21, and thus shift the entire mechanism into the position shown in FIG. 4, actuating the inverter switch 20 and displacing the elements 15 and 16 away from the tape by the sole action of the button $21^1$. The tape will then be driven at the higher fast forward speed.

Now turning to the third embodiment of the invention shown in FIGS. 5 and 6, the mechanism as there shown comprises the same elements as those of FIGS. 1 and 2 having the references 1 to 19, their cooperation and function being also similar.

As in the form of the invention shown in FIGS. 1 and 2 there is an inverter switch 20 which is adapted to connect the wires of the motor 2 either to a power source which drives the tape 11 by the capstan 6 at constant recording-playback speed (FIG. 5), or to a power source 25 causing the motor 2 to rotate at a higher speed (FIG. 6).

According to this embodiment of the invention the control element which causes the head 15 and the pressure roller 16 to be displaced from operative position and the control element for the inverter switch 20 are separate, and are not interconnected as in FIGS. 3 and 4, but are positioned physically such that they can be actuated simultaneously by one finger.

The supporting lever 17 which tends to be maintained in the operative position shown in FIG. 5 by the spring 19 is actuated by the slide 22 provided with a button 21 while the inverter switch 20 is actuated by a slide $22^1$ provided with a button $21^1$.

Moreover the buttons $21$-$21^1$ are embodied and arranged in such close proximity that they may also be manually actuated simultaneously with only one finger. The said buttons may be of the type comprising juxtaposed pushers, of the type comprising pushers with concentric arrangements, of the rotative type with concentric arrangement, or of the sliding type having juxtaposed slides, all with the possibility of actuating both elements either separately or together. In this way there is provided a simple and efficaceous device to produce if necessary an intermediate fast movement of the tape while retaining the advantages of the invention as shown in FIGS. 1 and 2.

I claim as my invention:

1. In a transport mechanism for driving a tape from reel to reel selectively at recording-playback speed or fast speed, the combination comprising, a frame for supporting the reels in operating position, a capstan drive for the tape including a capstan carried by the frame and a shiftable pressure roller, said shiftable pressure roller being displaceable from a first position in which said capstan drive is engaged with the tape to a second position in which said tape is released from said capstan drive, a motor drivingly connected to said capstan, drive means from said motor to one of said reels including a friction slipping device which slips to absorb the varying differential between recording-playback tape speed when the capstan drive is engaged and a higher nominal speed at which said one reel is driven via said direct drive means, switching means connected to the power supply circuit of said motor, said switching means having a first position connecting said motor to a power source driving the motor to rotate the capstan at recording-playback speed and a second position connecting said motor to a power source driving the motor at a faster speed, and manually actuable means for coincidentally shifting said pressure roller and said switching means from said first to said second positions to release the tape from said capstan drive and increase the motor speed to transport the tape at fast speed from reel to reel.

2. The combination according to claim 1 in which said manually actuable means includes independently operable elements for selectively as well as coincidentally shifting said pressure roller and said switching means from said first to said second positions, the independent shifting of said pressure roller without shifting said switching means providing an intermediate fast speed of the tape by said drive means.

3. The combination according to claim 2 in which said independently operable elements are a pair of elements connected respectively for shifting said pressure roller and said switching means, one of said pair connected to said switching means being also connected to the other for coincidentally shifting said pressure roller when actuated to shift said switching means from said first to second positions.

4. The combination according to claim 2 in which said independently operable elements are a pair of elements mounted in immediate proximity to each other and actuable manually simultaneously.

5. In a transport mechanism for driving a tape from reel to reel selectively at recording-playback speed or fast speed, the combination comprising, a frame for supporting the reels in operating position, a capstan drive for the tape including a capstan carried by the frame and a shiftable pressure roller, a lever movably supported on the frame and carrying said pressure roller for shifting movement, said lever being displaceable from a first position in which said capstan drive is engaged with said pressure roller pressing the tape against said capstan, to a second position in which said tape is released from said capstan drive and said pressure roller is located away from the tape, a motor drivingly connected to said capstan, drive means from said motor to one of said reels including a friction slipping device, and switching means connected in the power supply circuit of said motor, said switching means having a first position connecting said motor to a power source driving the motor to rotate the capstan at recording-playback speed and a second position connecting said motor to a power source driving the motor at a faster speed, and manually actuable means for coincidentally shifting said lever and said switching means from said first to said second positions to release the tape from said capstan drive and increase the motor speed to transport the tape at fast speed from reel to reel.

* * * * *